US005156059A

United States Patent [19]

Amonett et al.

[11] Patent Number: 5,156,059

[45] Date of Patent: Oct. 20, 1992

[54] RETRACTABLE COMPONENT MOUNTING PLATE FOR A CONTROL CONSOLE

[75] Inventors: Daniel K. Amonett; David E. Zink; Jack D. Sanders, all of Indianapolis, Ind.

[73] Assignee: Emerson Electric Co., St. Louis, Mo.

[21] Appl. No.: 753,240

[22] Filed: Aug. 30, 1991

[51] Int. Cl.[5] ........................ F16H 29/20; A47B 51/00

[52] U.S. Cl. ........................ 74/89.17; 74/106; 312/306; 312/312

[58] Field of Search ........................ 74/89.17, 106, 110, 74/89.18; 312/306, 312

[56] References Cited

U.S. PATENT DOCUMENTS

| | | | |
|---|---|---|---|
| Re. 22,933 | 11/1947 | Parsons | 74/89.17 |
| 1,811,428 | 6/1931 | Dibble | 312/306 X |
| 2,390,029 | 11/1945 | Parsons | 74/89.17 |
| 3,116,910 | 1/1964 | Moore et al. | 312/312 X |
| 3,904,853 | 9/1975 | Shoup et al. | 74/106 X |
| 4,941,718 | 7/1990 | Alexander et al. | 312/312 |
| 5,020,762 | 6/1991 | Hatta | 74/89.18 X |

FOREIGN PATENT DOCUMENTS

| | | | |
|---|---|---|---|
| 527516 | 5/1955 | Italy | 74/110 |
| 52-7700 | 1/1977 | Japan | 312/306 |
| 2168447 | 6/1986 | United Kingdom | 74/106 |

*Primary Examiner*—Leslie A. Braun
*Assistant Examiner*—Julie Krolikowski
*Attorney, Agent, or Firm*—Robert F. Meyer

[57] ABSTRACT

The component mounting plate of a control console for an appliance such as a washer or dryer is retractable so that the console's knobs are flush with the appliance's outer trim panel.

7 Claims, 3 Drawing Sheets

RETRACTABLE COMPONENT MOUNTING PLATE FOR A CONTROL CONSOLE

BACKGROUND OF THE INVENTION

The present invention relates to a control console and more particularly to such a control console that has a retractable component mounting plate such that the control knobs can be retracted and be flush with the appliance's outer trim panel's surface.

In appliances such as a washer or dryer there are control consoles which carry, among other things, control knobs which control the appliance's operations. The knobs extend beyond the outer surface of the outer trim panel of the appliance and in some cases are not aesthetically pleasing. In addition the extended knobs are more difficult to keep clean.

Accordingly, there is provided a control console that includes a component mounting plate which is retractable when not in use.

SUMMARY OF THE INVENTION

In general, the invention relates to a control console having a retractable component mounting plate comprising a frame, a pair of crank shafts rotatably carried in the frame, a pair of lift bars rotatably carried on respective ones of the pair of crank shafts, a component mounting plate carried by the pair of lift bars, a motor including motor output means, and drive means connecting the motor output means to the pair of crank shafts to drive same.

DETAILED DESCRIPTION OF THE INVENTION

Figure 1:
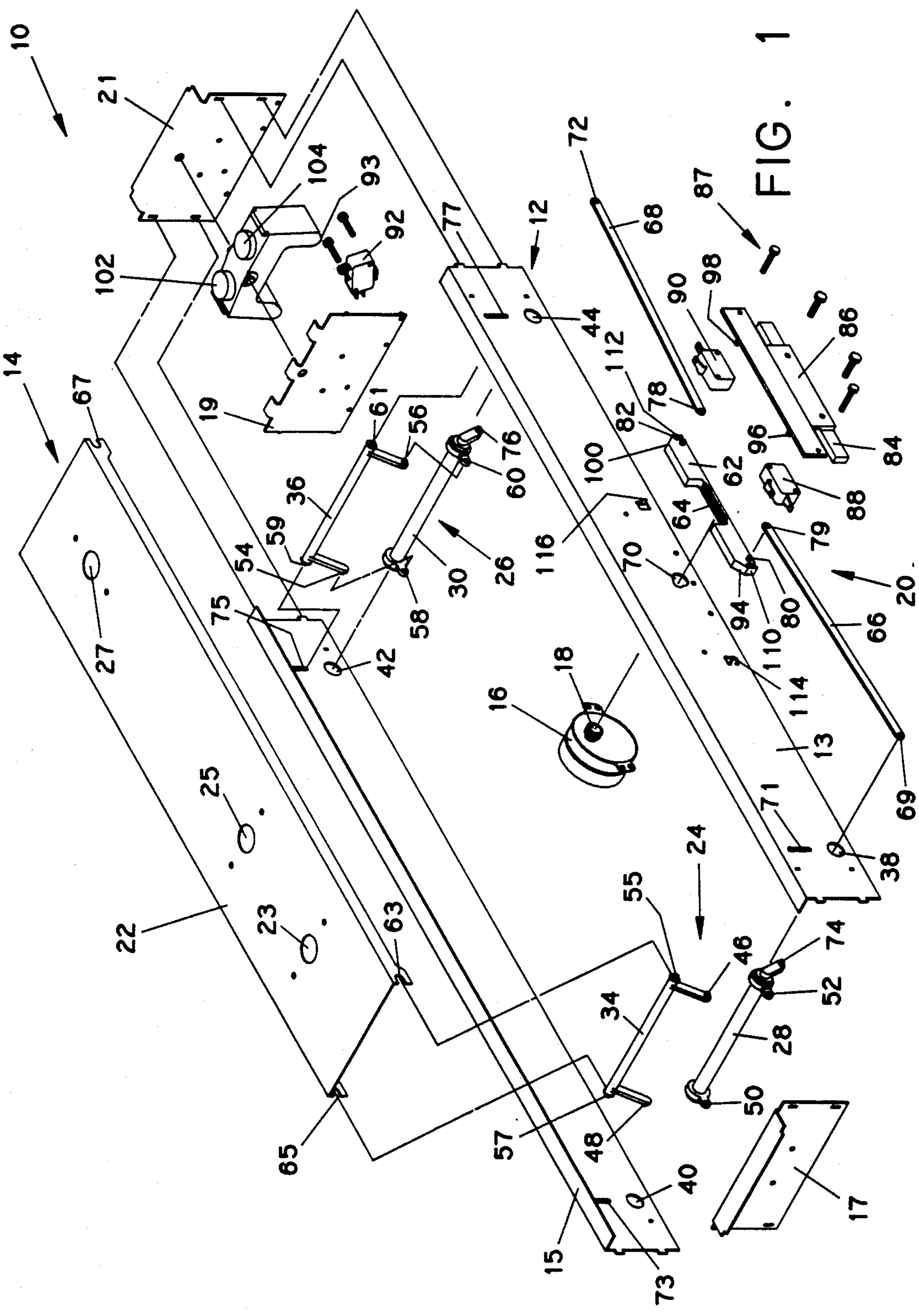
FIG. 1 is an exploded view of a control console using a component mounting plate of the invention.

Referring now to FIG. 1 there is shown a control console 10 employing the features of the invention. Control console 10, in general, includes a frame 12, a component mounting plate 14, a motor drive 16 having an output pinion 18, and drive means 20 connecting the output pinion with the component mounting plate 14. Frame means 12 includes side plates 13 and 15 and end plates 17, 19 and 21. Component mounting plate 14 includes a plate 22 having apertures 23, 25, and 27 which carry knobs 29, 31, and 33. Plate 22 is connected to frame means 12 through pivot drive means 24 and 26.

Pivot drive means 24 and 26 includes a pair of crank shafts 28 and 30, and lift bars 34 and 36. Crank shafts 28 and 30 are rotatably journalled in side plates 13 and 15 through apertures 38, 40, 42, and 44. Lift bars 34 and 36 are pivotally carried on crank shafts 28 and 30 through pins 46 and 48 engaging ears 50 and 52 carried by crank shaft 28 and pins 54 and 56 engaging ears 58 and 60 of crank shaft 30. Pins 55, 57, 59, and 61 engage notches 63, 65, 67 in plate 22 and a notch opposite notch 67 and also slideably ride in slots 71, 73, 75 and 77.

Drive means 20 includes a rack 62 having teeth 64 and tie rods 66 and 68. Output pinion 18 extends through aperture 70 to engage teeth 64.

Connecting rods 66 and 68 connect crank shafts 28 and 30 through eyelets 69 and 72 engaging pins 74 and 76. They are connected to rack 62 through eyelets 79 and 78 engaging pins 80 and 82. The rack slides on a shelf 84 which is carried by holding frame 86 that is attached to side plate 13 through screws 87 engaging appropriate threaded holes on the side plate.

Control console 10 also includes electrical switches 88, 90, and 92 which, as will be herein after described, control the operation of motor 16 and the component mounting plate 14. Switches 88 and 90 are carried on pins 96 and 98 extending from holding frame 86. They are actuated by ramps 94 and 100 of rack 62 as it slides on shelf 84. Switch 92 is carried on plate 19 along with buttons 102 and 104. Buttons 102 and 104 actuate switch 92.

Figure 2:
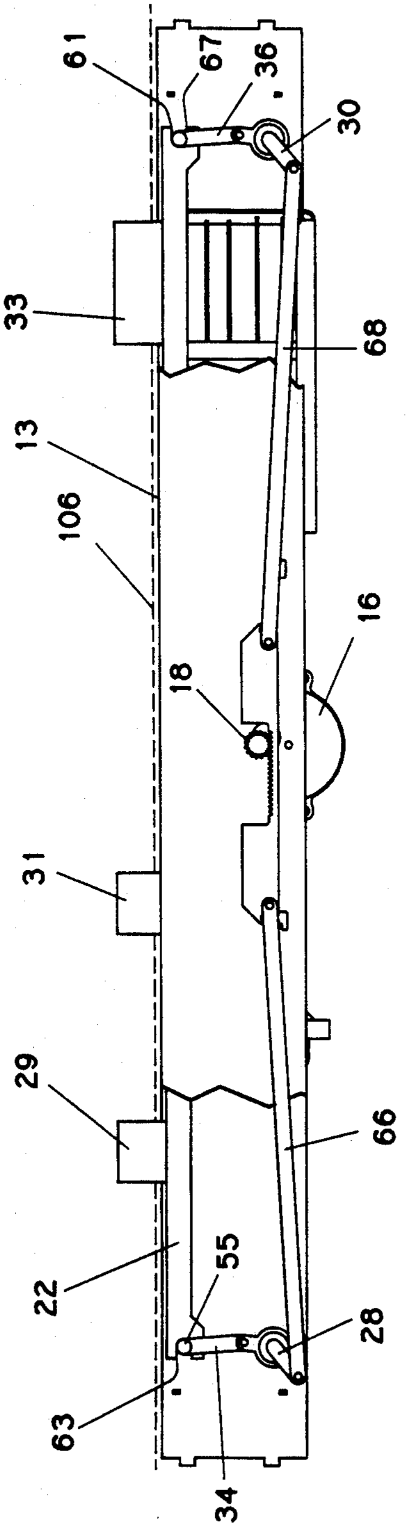
FIG. 2 is a side view of the control console showing its different operating positions.
Figure 3:
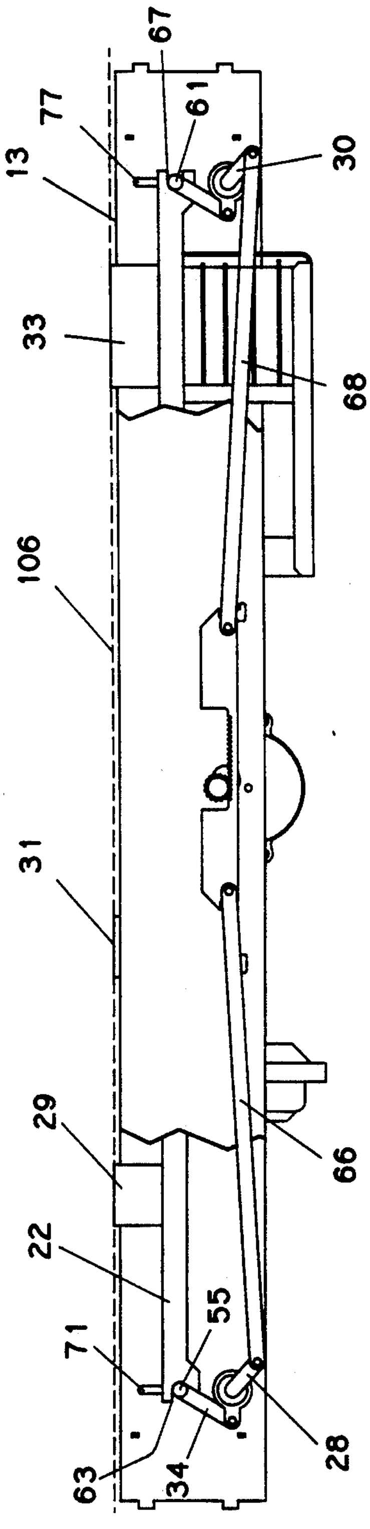
FIG. 3 is a side view of the control console showing its different operating position.
Figure 4:
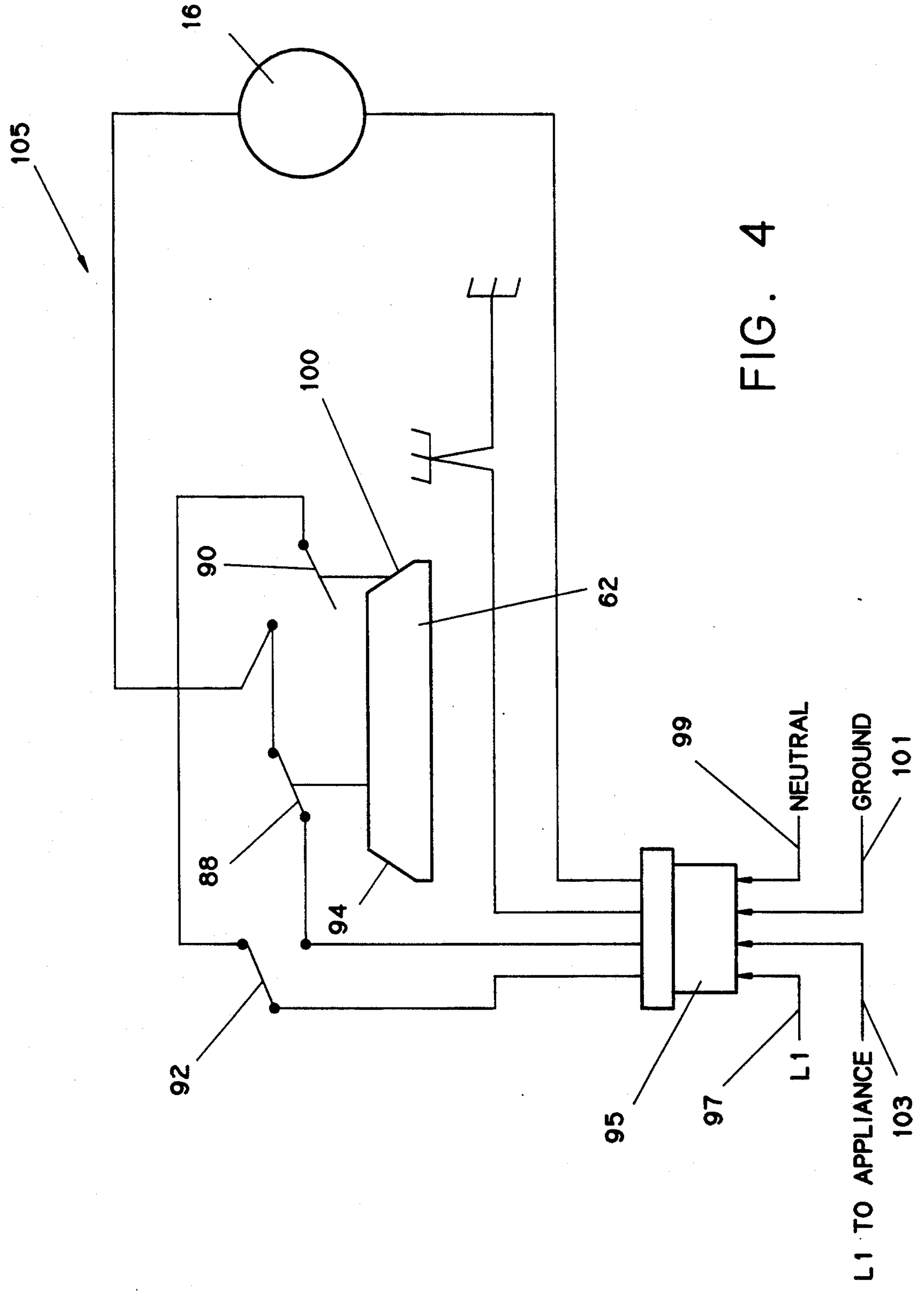
FIG. 4 is a wiring diagram schematically illustrating the operation of the control console.

The operation of the device can now be described with reference to FIGS. 1–4. In the schematic of FIG. 4, leads 97, 99, and 101 supply power to control console 10 through circuit 105. Starting with all of the knobs 29, 31, and 33 in the "out" position, as shown in FIG. 2, the user rotates the knobs to the desired setting and then presses button 102 placing it in the start position to activate switch 92 through ramp 93. This starts motor 16 through snap switch 88. Motor 16 drives output pinion 18 which in turn moves rack 62. Movement of rack 62 drives crank shafts 28 and 30 through connecting rods 66 and 68 which in turn pivot lift bars 34 and 36. Movement of the lift bars moves plate 22 and the knobs to recess the knobs substantially flush with the outer trim panel 106 of the appliance (FIG. 3), thus the knobs, with integral knob mechanism mounted under plate 22, recess into a clearance provided under plate 22. The amount the knobs are recessed is controlled by pins 55, 57, 59, and 61 bottoming out in slots 71, 73, 75, and 77. When the lift bars reach their position, rack 62 actuates snap switch 88 through ramp 94 to turn off motor 16 and stop the action of the lift bars. In addition switch 92 supplies power to the appliance through outlet 95 and lead 103 to operate the appliance per the control console settings.

When the user wants to change the control settings or start over, he pushes button 104 to place switch 92 in a select position through ramp 93. This provides power through switch 90 to the motor to drive rack 62 in the opposite direction and the entire mechanism through the same linkage as before to extend plate 14 with the knobs to their "out" position. When the lift bars 34 and 36 reach the end of their throw, rack 62 actuates switch 90 through ramp 100 to turn off motor 16 and stop the action of plate 14. In this position all control knobs 29, 31, and 33 are fully extended and accessible to the user for selection of the next setting and the process starts over again.

The motor 16 is bi-directional. When power is applied it can start in either direction. If it starts rotating in the correct direction for the operating conditions it will drive the rack 62 and mechanism to extend or retract the plate 14 until power is interrupted by switch 88 or 90. If it starts in the incorrect direction for the operating conditions the motor will automatically reverse due to the rack 62 exerting excessive resistance since it is at its maximum travel. Specifically, maximum travel is defined by stop means 108 which includes ends 110 and 112 of rack 62 engaging tabs 114 and 116 of frame 13.

Such engagement stops the travel of the rack causing the motor to reverse its rotational direction. Upon a correct rotation, the operation will proceed as noted above.

What is claimed is:

1. A control console comprising:

a. a frame, b. a pair of crank shafts rotatably carried in said frame, c. a pair of lift bars rotatably carried on respective ones of the pair of shafts, d. a component mounting plate carried by said lift bars, e. a motor including a motor output means including a pinion, said pinion engaging teeth in a sliding said rack, and f. a drive means including:

(1) said rack connected to said output means and to said pair of crank shafts, and (2) a pair of tie rods connecting said rack to said pair of crank shafts.

2. A control console according to claim 1 further including a pair of individual switches biased by said sliding rack to open and close same and alternately turn said motor on and off.

3. A control console according to claim 2 further including a start switch energizing and deenergizing said pair of individual switches, individually and alternately.

4. A control console according to claim 1 wherein said motor is bidirectional and wherein stop means stops a travel of said sliding rack thereby causing said motor to reverse a wrong way directional rotation.

5. A control console according to claim 4 wherein said stop means includes tabs extending from said frame and engaging said sliding rack.

6. A control console comprising: a frame, a pair of crank shafts rotatably carried in said frame, a pair of lift bars rotatably carried on respective ones of the pair of shafts, a component mounting plate carried by said lift bars, a motor mounted on said frame, and a drive means driven by said motor wherein said pair of crank shafts, said pair of lift bars, said motor, and said drive means are positioned around the a periphery of said component mounting plate providing a clearance under said component mounting plate for mounting controls on said component mounting plate that have components extending under said component mounting plate.

7. A control console comprising: a frame, a pair of crank shafts rotatably carried in said frame, a pair of lift bars rotatably carried on respective ones of the pair of shafts, a component mounting plate carried by said lift bars, a motor carried on said frame, and a drive means driven by said motor including a rack and a pair of tie rods connecting said rack to said pair of crankshafts wherein axial displacement of said component mounting plate is accomplished by said pair of crankshafts that convert tie rod axial movement of said tie rods into a crankshaft rotary motion and said lift bars convert rotary motion of said crankshafts into a lift bar pivotal motion that is used to axially displace said component mounting plate.

* * * * *